United States Patent
Ebert et al.

(10) Patent No.: US 11,925,520 B2
(45) Date of Patent: Mar. 12, 2024

(54) METHOD OF PRODUCING A DENTAL OBJECT

(71) Applicant: Ivoclar Vivadent AG, Schaan (LI)

(72) Inventors: Jörg Ebert, Buchs (CH); Pascal Scherrer, Chur (CH); Alexander Schöch, Schaan (LI); Marius Aster, Kastelbell/Tschars (IT)

(73) Assignee: Ivoclar Vivadent AG, Schaan (LI)

( * ) Notice: Subject to any disclaimer, the term of this patent is extended or adjusted under 35 U.S.C. 154(b) by 0 days.

(21) Appl. No.: 18/057,524

(22) Filed: Nov. 21, 2022

(65) Prior Publication Data

US 2023/0157795 A1     May 25, 2023

(30) Foreign Application Priority Data

Nov. 25, 2021   (EP) .................... 21210515

(51) Int. Cl.
| | |
|---|---|
| *B29C 64/393* | (2017.01) |
| *A61C 13/00* | (2006.01) |
| *B29C 64/40* | (2017.01) |
| *B33Y 10/00* | (2015.01) |
| *B33Y 80/00* | (2015.01) |

(52) U.S. Cl.
CPC ........ *A61C 13/0019* (2013.01); *B29C 64/393* (2017.08); *B29C 64/40* (2017.08); *B33Y 10/00* (2014.12); *B33Y 80/00* (2014.12)

(58) Field of Classification Search
None
See application file for complete search history.

(56) References Cited

U.S. PATENT DOCUMENTS

| | | | | |
|---|---|---|---|---|
| 10,384,263 | B2 * | 8/2019 | Craeghs | ............... B29C 64/153 |
| 10,899,088 | B2 * | 1/2021 | Amaya | ............... B29C 67/0011 |
| 11,314,231 | B2 * | 4/2022 | Barua | ............... B23K 26/0006 |
| 2015/0282946 | A1 | 10/2015 | Hunt | |
| 2016/0200051 | A1 * | 7/2016 | Urbanic | ............... B29C 64/393 |
| | | | | 264/308 |
| 2018/0228613 | A1 | 8/2018 | Jones et al. | |
| 2019/0263070 | A1 * | 8/2019 | Barth | ............... B33Y 40/20 |
| 2020/0307071 | A1 * | 10/2020 | Hsu | ............... B29C 64/129 |
| 2020/0307108 | A1 * | 10/2020 | Frantz | ............... B29C 64/135 |

FOREIGN PATENT DOCUMENTS

WO      2021046615 A1    3/2021

* cited by examiner

*Primary Examiner* — Yung-Sheng M Tsui
(74) *Attorney, Agent, or Firm* — Ann M. Knab; Thad McMurray

(57) ABSTRACT

A method of producing a dental object (100), including the steps of producing a pillared support structure (101) on the dental object (100); and producing a lattice structure (103) for reinforcing the support structure (101).

16 Claims, 8 Drawing Sheets

METHOD OF PRODUCING A DENTAL OBJECT

CROSS-REFERENCE TO RELATED APPLICATIONS

This application claims priority to European Patent Application No. 21210515.9 filed on Nov. 25, 2021, the disclosure of which is incorporated herein by reference in its entirety.

TECHNICAL FIELD

The present invention relates to a method of producing a dental object and a dental object.

BACKGROUND

In additive manufacturing processes, so-called support structures are often required for successfully producing the dental object. These support structures are produced by the machine during the manufacturing process, for example by an FDM (Fused Deposition Modeling), SLA (Stereolithography Apparatus) or SLS (Selective Laser Sintering) printer. Due to the layer-by-layer production in these processes, certain areas of the workpiece are supported by such additional support structures.

So-called pillars are often used as support structures to provide local support for the dental object to be produced. However, these offer little stability. Lattices are also used. However, these require a high material input.

WO 2021046615 and US 20190263070, US 20180228613, and US 20150282946 are directed to lattice structures and/or printing materials, which US published applications are hereby incorporated by reference in their entirety.

SUMMARY

It is the technical object of the present invention to support a dental object during fabrication with a support structure which, on the one hand, offers high stability and, on the other hand, can be realized with a low material input.

This technical object is solved by objects according to the independent claims. Technically advantageous embodiments are the subject of the dependent claims, the description and the drawings.

According to a first aspect, the technical object is solved by a method of producing a dental object, comprising the steps of producing a pillared support structure on the dental object; and producing a lattice structure for reinforcing the support structure. The lattice structure can be produced either from additional vertical and oblique struts between or on the support structures, or with oblique struts between and on the support structures. This combined support structure has the technical advantage that it has a high stability and can be produced with low material input.

In a technically advantageous embodiment of the method, the lattice structure is arranged laterally adjacent to the support structure. This has the technical advantage, for example, that the pillared support structure can be reinforced specifically on one side and the material input is further reduced.

In a further technically advantageous embodiment of the method, the lattice structure is arranged around the support structure. This provides, for example, the technical advantage that the pillared support structure is reinforced from all sides.

In a further technically advantageous embodiment of the method, the support structure is arranged on the lattice structure. This provides, for example, the technical advantage that part of the pillared support structure can be replaced by the lattice structure, thus improving stability.

In a further technically advantageous embodiment of the method, the lattice structure is produced by at least one of a triangular structure, a quadrangular structure, a pentagonal structure, and a hexagonal structure. This provides, for example, the technical advantage that particularly stable lattice structures are used.

In a further technically advantageous embodiment of the method, the support structure is integrated into the lattice structure. This provides, for example, the technical advantage that the material input is further reduced.

In a further technically advantageous embodiment of the method, the support structure is at least partially replaced by the lattice structure. This also provides the technical advantage, for example, that the material input is further reduced.

In a further technically advantageous embodiment of the method, the lattice structure is produced between several support structures, such as by means of struts formed between support structures. This also provides the technical advantage, for example, that a high stability of the lattice structure is achieved and the material input is reduced. In another technically advantageous embodiment of the method, vertical pillars of the lattice structure are connected by diagonal or oblique struts. The lattice structure can form a pyramid shape. This also provides, for example, the technical advantage of achieving a high stability of the lattice structure.

In a further technically advantageous embodiment of the method, one, two or more oblique struts are connected to the support structure to produce the lattice structure. This also provides, for example, the technical advantage of achieving a high stability of the lattice structure.

In another technically advantageous embodiment of the method, an oblique strut is connected to the support structure to produce the lattice structure. The lattice structure can partially replace the support structure. This also provides, for example, the technical advantage that a high stability of the lattice structure is achieved.

In a further technically advantageous embodiment of the method, the dental object, the support structure and/or the lattice structure are produced by means of a 3D printing process. This also provides, for example, the technical advantage that the dental object, the support structure and/or the lattice structure can be produced in a simple and fast manner.

According to a second aspect, the technical task is solved by a dental object comprising a pillared support structure on the dental object; and a lattice structure for reinforcing the support structure. The dental object achieves the same technical advantages as the method according to the first aspect.

In a technically advantageous embodiment of the dental object, the lattice structure is arranged laterally adjacent to the support structure. This also provides the technical advantage, for example, that the pillared support structure can be specifically reinforced on one side and the material input is further reduced.

In another technically advantageous embodiment of the dental object, the lattice structure is arranged around the support structure. This also provides, for example, the technical advantage that the pillared support structure is reinforced from all sides.

In another technically advantageous embodiment of the dental object, the support structure is arranged on the lattice structure. This also provides the technical advantage, for example, that part of the pillared support structure can be replaced by the lattice structure, thus improving stability.

In another technically advantageous embodiment of the dental object, the lattice structure comprises at least one of a triangular structure, a quadrangular structure, a pentagonal structure, and a hexagonal structure.

According to a third aspect, the technical task is solved by a computer program comprising instructions that cause a 3D printing device to perform the method steps according to the first aspect. The computer program achieves the same technical advantages as the method according to the first aspect. The computer program product comprises program code which is stored on a non-transitory machine-readable medium, the machine-readable medium comprising computer instructions executable by a processor. The processor may be part of a 3D printing device.

BRIEF DESCRIPTION OF THE DRAWINGS

Exemplary embodiments of the invention are shown in the drawings and are described in more detail below, in which.

DETAILED DESCRIPTION

Figure 1:
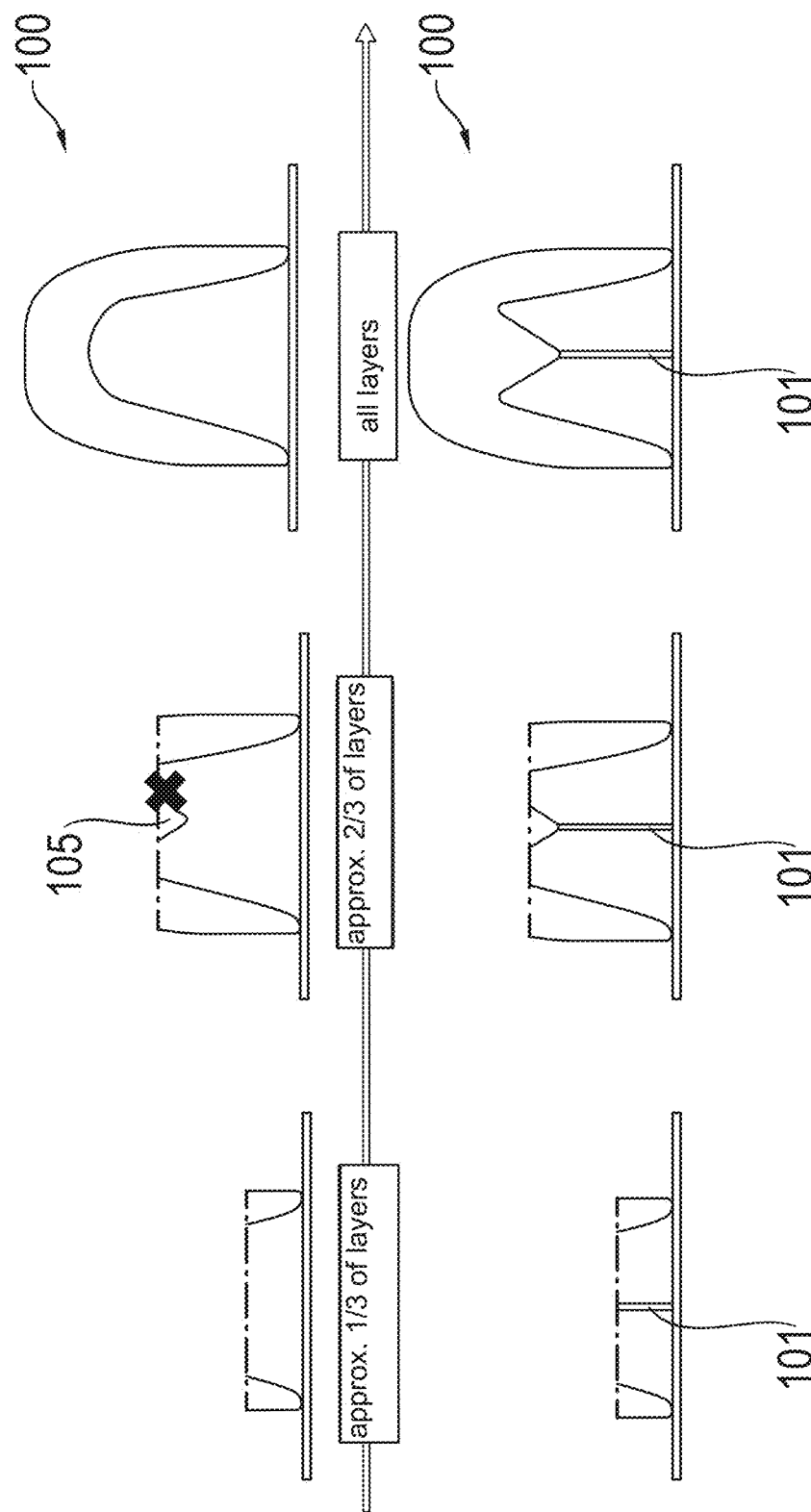
FIG. 1 shows a schematic view of a structure of a dental object with and without a pillared support structure.

FIG. 1 shows a schematic view of conditions during a manufacturing process of a dental object 100 with and without pillared support structure 101.

For example, the dental object 100 is a dental restoration, such as a crown, a bridge, a veneer, an abutment, an inlay, or an onlay.

The dental object 100 is produced layer by layer using an additive manufacturing process, such as a 3D printing process. On the left side, approximately one third of the layers have been completed, in the middle two thirds of the layers have been completed and on the right side all layers of the dental object 100 have been completed. In the process, the building panel moves from above into a trough with material. For the layer-by-layer buildup, exposure takes place from below using Digital Light Processing (DLP). A manufacturing process without support structures 101 can result in freely suspended geometries 105 and errors in the production of the dental object 100 (top). In contrast, a manufacturing process with support structures 101 does not result in freely suspended, defective geometries 105 (bottom). A manufacturing process with support structures 101 is often necessary to obtain a correct geometry of the dental object 100. In addition to the weight force, other forces such as a tensile force and shear force act on the dental object 100 or the support structures 101, depending on the manufacturing process.

Figure 2:
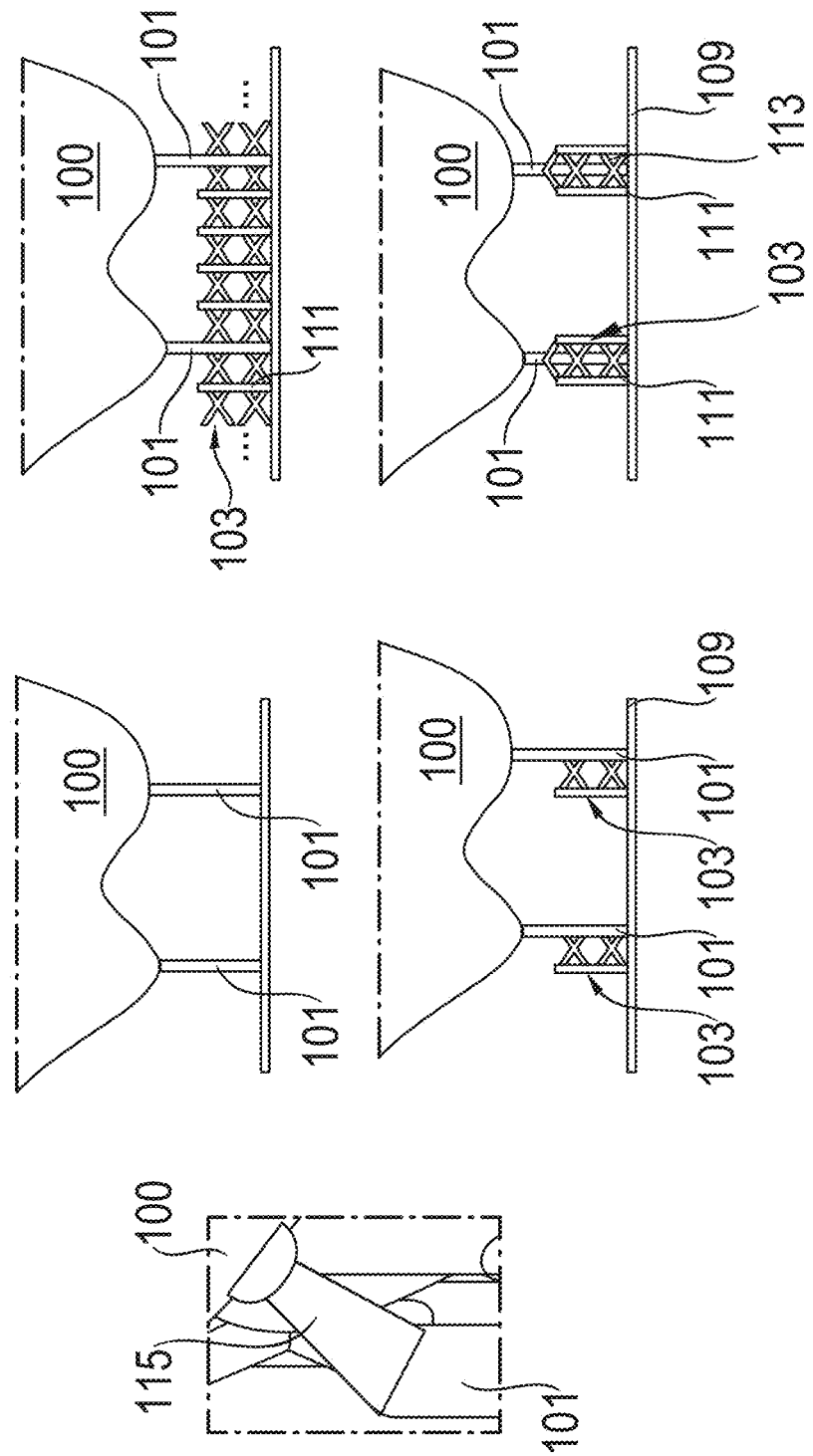
FIG. 2 shows a schematic view of a structure of a dental object with pillared support structure reinforced by a lattice structure.

FIG. 2 shows a schematic view of a structure of a dental object 100 with pillared support structure 101, which is reinforced by an additional lattice structure 103. The support structures 101 and/or lattice structures 103 are arranged on a building panel 109 and extend from the building panel 109 toward the dental object 100. The support structures 101 can extend in a bridge-like manner between the dental object 100 and a building panel 109. The support structures 101 typically have a length of 2 to 100 mm, 10 to 90 mm, 20 to 70 mm and ranges in between the stated ranges and a diameter of 0.5 to 3 mm, 0.8 to 2 mm, 1 to 1.5 mm and ranges in between the stated ranges.

The additional lattice structure 103 improves the resistance of support structures 101 to shear forces without consuming significantly more material. These shear forces occur, for example, in classic DLP (Digital Light Processing) processes with separation from a reference plane. The lattice structures 103 are formed by vertical struts 111 connected by diagonal or oblique struts 113. The vertical struts 111 run parallel to the pillared support structures 101. For example, the vertical struts 111 do not extend between the building panel 109 and the dental object 100, or the vertical struts 111 have a distance therefrom. The diagonal or oblique struts 113 support the vertical struts 111 against each other.

The diameter of the pillared support structure 101 may be less than, equal to, or greater than the diameter of the vertical struts 111. The vertical struts 111 can be arranged in, for example, but not limited to, a triangular structure, a quadrangular structure, a pentagonal structure, and/or a hexagonal structure.

The cross-section of the pillared support structure 101, the vertical or diagonal or oblique struts 111 or 113 may be circular, square or oval. In general, other cross-sectional shapes may be used. The support structures 101 may have support heads 115 at angled tips 115 that engage the dental object 101. The support heads 115 serve as an interface between the support structures 101 and the dental object 100.

The support head 115 is the only point of contact between the point of the dental object 100 to be supported and the support structure 101. The interface should be chosen to be as small as possible without compromising the stability and strength of the connection. Ideally, the support head 115 projects to the surface of the dental object 100 at a perpendicular angle. The support head 115 comprises three elements, namely the head cone, the head tip ball or hemisphere, and head back ball. The sizes of these elements may be determined by a set of parameters.

The pillared support structures 101 are reinforced by dynamically generated and locally confined lattice structures 103. The lattice structure 103 improves the stability of the pillared or columnar support structure 101. In contrast to large-scale lattice structures 103, the combination of pillared support structure 101 with an additional local lattice structure 103 causes less material consumption. The lattice structure 103 can be arranged only in a predetermined area around the support structure 101. At the same time, a higher stability is achieved than only with pillared support structures 101.

At the top on the left is a structure in which only pillared support structures 101 are used without further lattice structures 103. At the top on the right, a large-scale lattice structure 103 is used in addition to the pillared support structures 101.

Bottom left, the pillared support structure 101 is selectively extended or supplemented laterally by a lateral lattice structure 103. Bottom right, the pillared support structure 101 is partially replaced by the lattice structure 103. Here, only the part of the pillared support structure 101 that provides the connection to the dental object 101 is retained. The geometry of the connection between the dental object 100 and the support structure 101 can be freely selected and need not be vertically aligned.

To ensure the most isotropic behavior possible, the generated lattice structure 103 can be chosen accordingly, such as with an equilateral triangle arranged uniformly around the support structure 101. In this way, a statically determined design can be achieved that best withstands the process forces with minimal material input.

Figure 3:
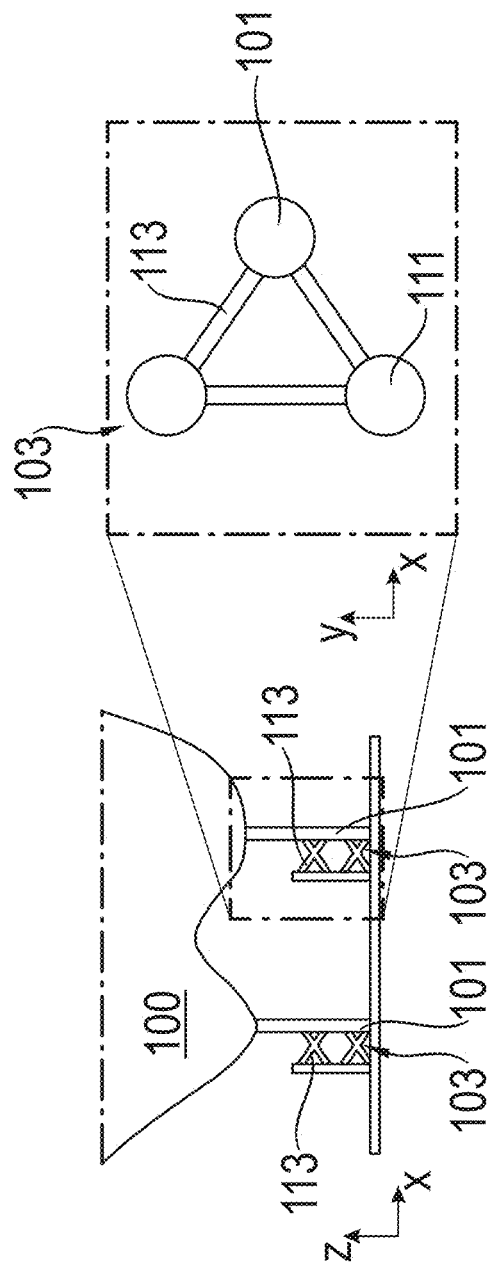
FIG. 3 shows another schematic view of a structure of a dental object with pillared support structure reinforced by a lattice structure.
Figure 3:
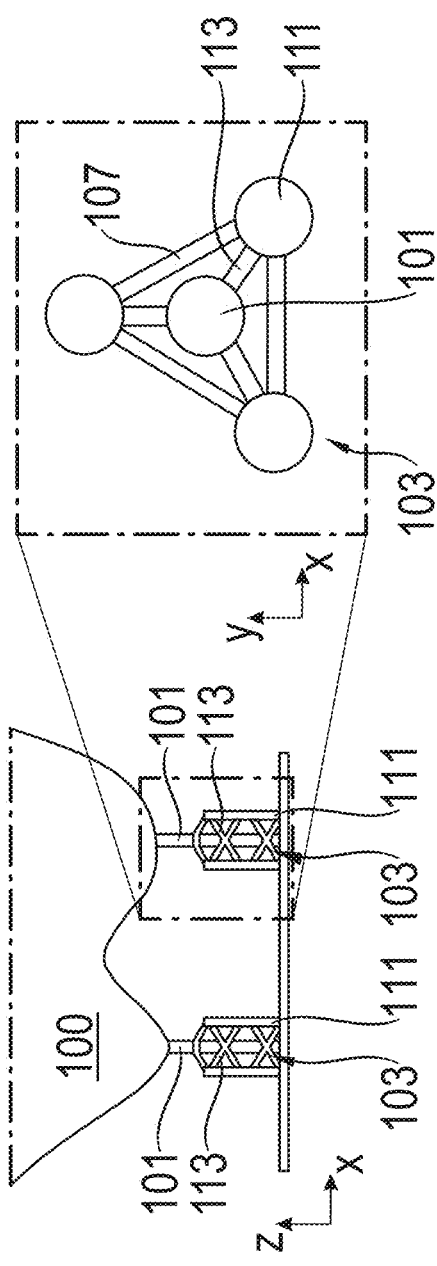

FIG. 3 shows another schematic view of a structure of a dental object 100 with pillared support structure 101 reinforced by a lattice structure 103.

Shown above is a supplemental structure in which the pillared support structure 101 is supplemented by the lattice structure 103. A side view of the supplemental structure is shown on the left and a top view of the supplemental structure is shown on the right. The pillared support structure 101 is integrated into the lattice structure 103. For this purpose, the vertical struts 111 of the lattice structure 103 are connected to the pillared support structure 101 by diagonal or oblique struts 113.

Shown below is a replacement structure in which the pillared support structure 101 is partially replaced by the lattice structure 103. A side view of the replacement structure is shown on the left and a top view of the replacement structure is shown on the right. The vertical struts 111 of the lattice structure 103 are arranged in an equilateral triangle 107 around the pillared support structure 101.

The pillared support structure 101 and the lattice structure 103 are produced using additive manufacturing processes and are thus easy to integrate into the manufacturing process.

A digital implementation of the support structure 101 and the lattice structure 103 can be realized in a software system.

This software system can in turn be integrated into the manufacturing process, which in turn can be arranged in a higher-level process, such as an assembly. Since machines for additive manufacturing can accept any valid geometry information, no special structural measures are required for integration into the manufacturing process. The adjustments for process integration are limited only to the software system.

Figure 4:
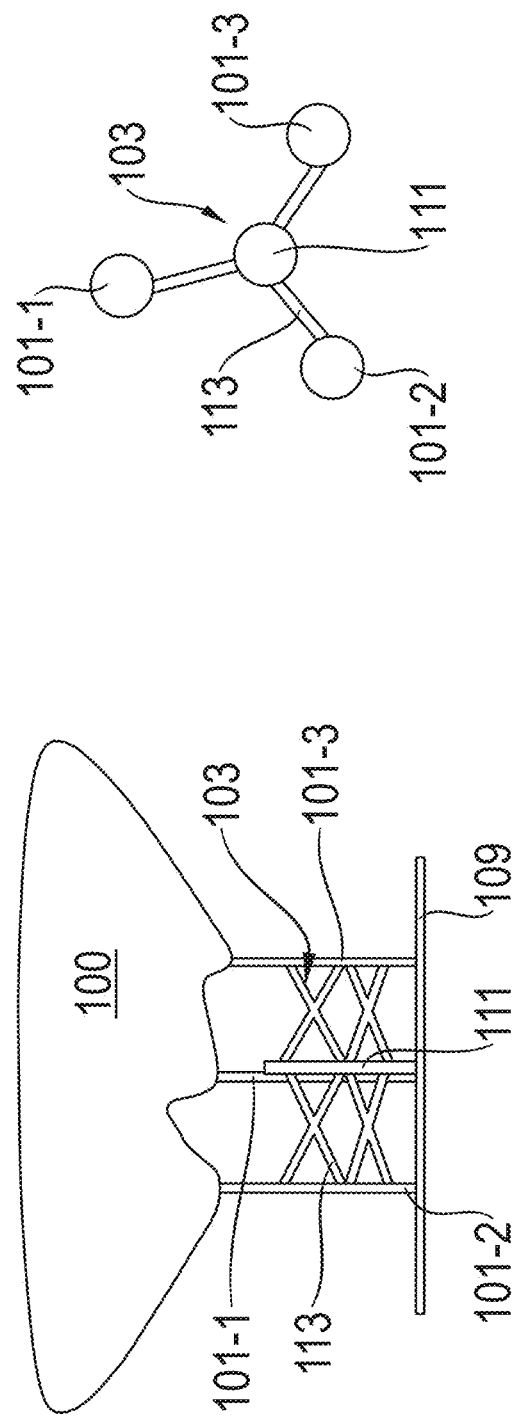
FIG. 4 shows another schematic view of a structure of a dental object with pillared support structure reinforced by a lattice structure.

FIG. 4 shows another schematic view of a structure of a dental object 100 having a pillared support structure 101 reinforced by a lattice structure 103. In this embodiment, the lattice structure 103 is constructed between two or more support structures 101 by vertical struts 111 from which the struts 113 are drawn to the support structures 101 to generate the framework.

Figure 5:
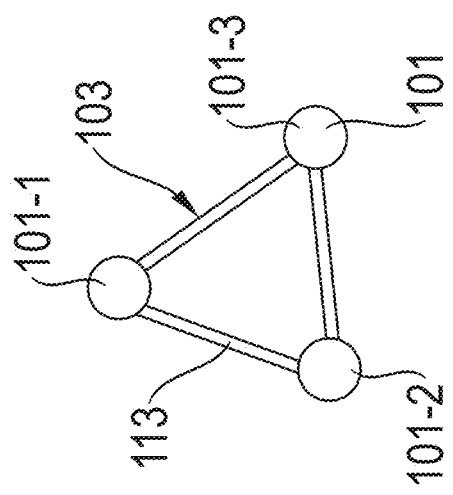
FIG. 5 shows another schematic view of a structure of a dental object with pillared support structure reinforced by a lattice structure.
Figure 5:
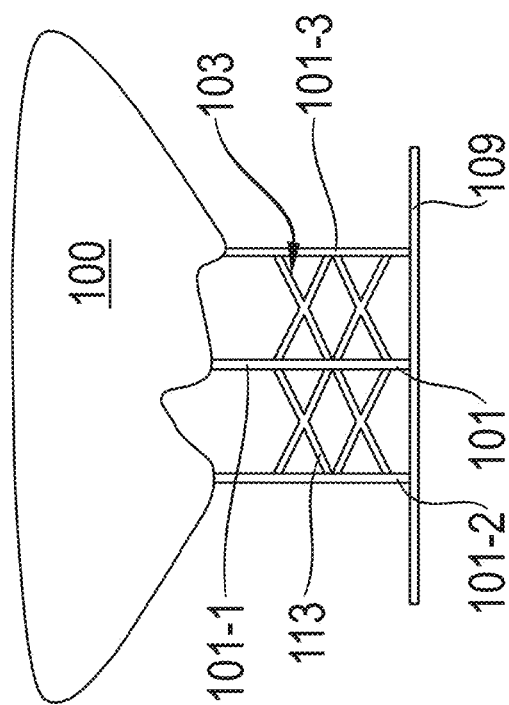

FIG. 5 shows another schematic view of a structure of a dental object 100 having a pillared support structure 101 reinforced by a lattice structure 103. In this embodiment, the lattice structure 103 is produced only by struts 113 between several support structures 101.

Figure 6:
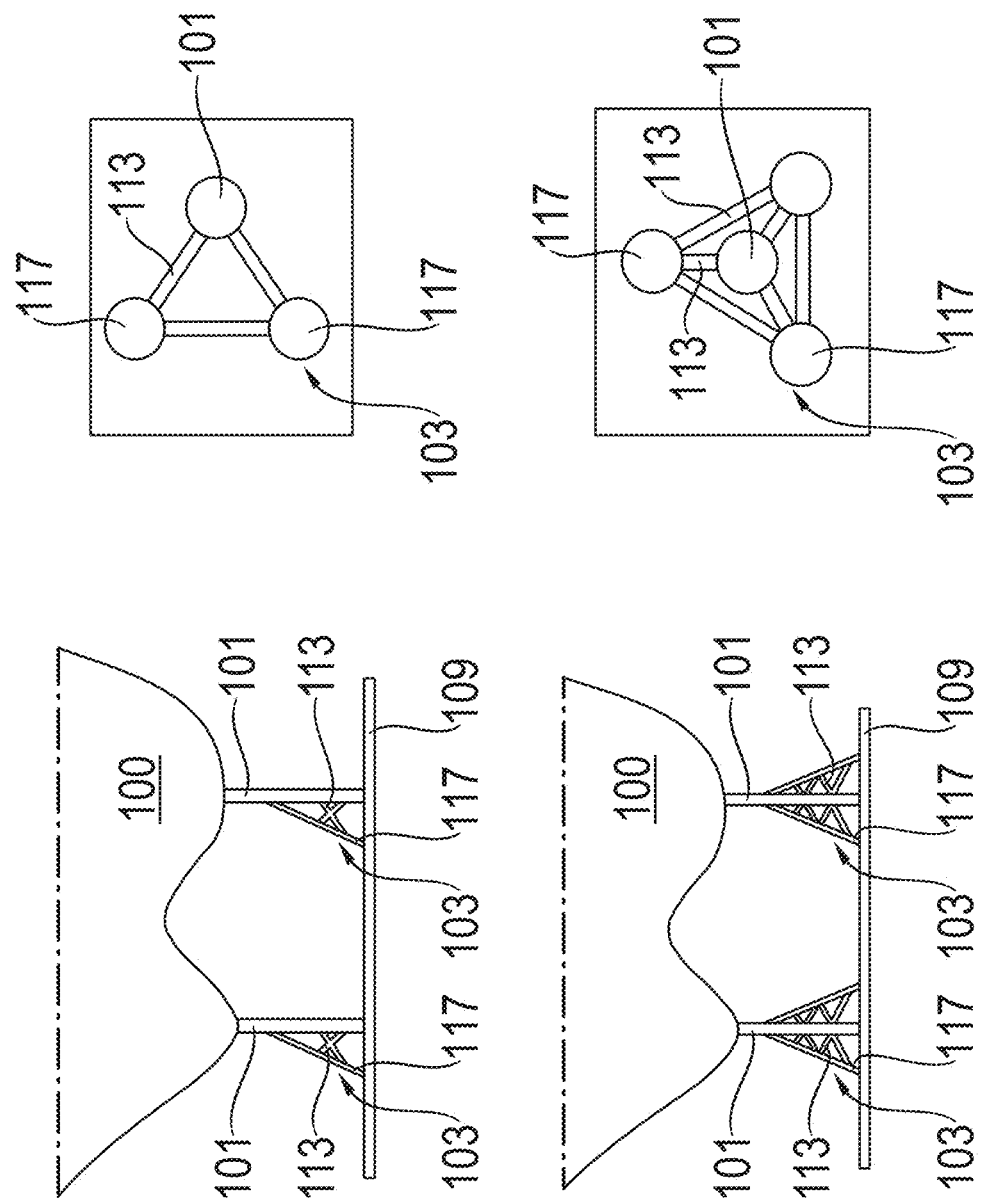
FIG. 6 shows another schematic view of a structure of a dental object with pillared support structure reinforced by a lattice structure.

FIG. 6 shows another schematic view of a structure of a dental object 101 having a pillared support structure 101 reinforced by a lattice structure 103. In this embodiment, two or more oblique struts 117 are connected to the support structure 101 to create the lattice structure 103. The oblique struts 117 converge to a common intersection.

The oblique struts 117 are also connected to each other and to the support structure 101 by transverse oblique struts 113. The lattice structure 103 has a polygonal or pyramidal shape arranged laterally on the support structure 101 or arranged around the support structure 101.

Figure 7:
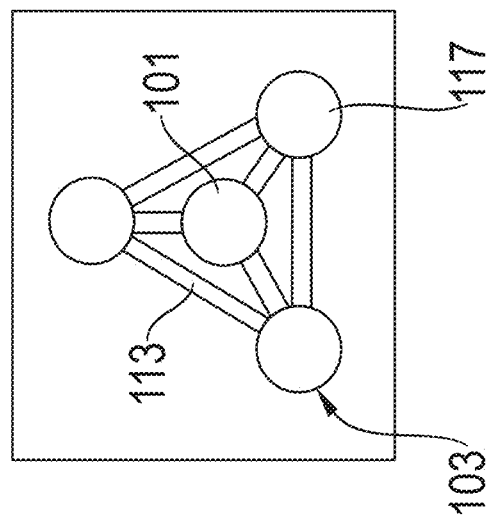
FIG. 7 shows another schematic view of a structure of a dental object with pillared support structure reinforced by a lattice structure.
Figure 7:
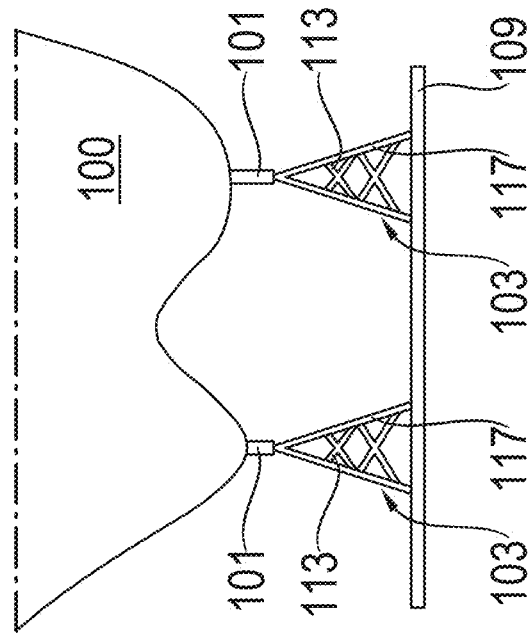

FIG. 7 shows another schematic view of a structure of a dental object 100 having a pillared support structure 101 reinforced by a lattice structure 103. In this embodiment, a plurality of oblique struts 117 are connected to the support structure 101 to create the lattice structure 103. The oblique struts 117 are also connected to each other and the support structure 101 with transverse oblique struts 113. The lattice structure 103 has a polygonal or pyramidal shape and partially replaces the support structure 101.

Figure 8:
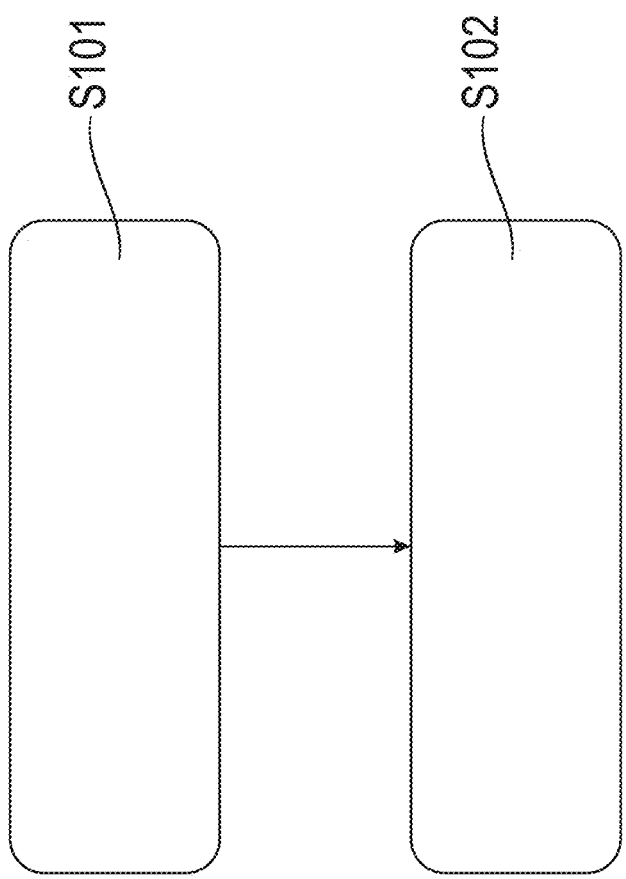
FIG. 8 shows a block diagram of a method of producing the dental object.

FIG. 8 shows a block diagram of a method of producing the dental object 100. The method comprises the step S101 of producing the pillared support structure 101 on the dental object 100. The pillared support structure 101 is generated in the areas where the distance between the dental object 100 to be produced and the building panel 109 is the smallest, i.e., has a local minimum. The position of the minimum can be obtained by an algorithm through an analysis of the three-dimensional shape of the dental object 100. First, all local minima are determined by an algorithm for this purpose.

Further pillared support structures 101 are created when the course of the surface contour of the dental object 100 in relation to the building panel 109 is below a predetermined angle, such as 45°. In this case, the surfaces extending laterally from the minimum are additionally supported by further pillared support structures 101. If the course of the surface contour of the dental object 100 relative to the building panel 109 is above the predetermined angle, no additional support structures 101 need to be added.

For this purpose, it is analyzed which triangles belong to the same overhang structure. Next, the area of the triangles of an overhang structure is determined. If this exceeds a predetermined size, further pillared support structures 101 are added to support the overhang structure.

The method further comprises the step S102 of producing a lattice structure 103 for reinforcing the support structure 101. The lattice structure 103 supplements or surrounds the support structure 101 or partially replaces it. The method produces a support structure that has high stability and can be produced with a small amount of material.

All of the features explained and shown in connection with individual embodiments of the invention may be provided in different combinations in the subject matter of the invention to simultaneously realize their beneficial effects.

All process steps can be implemented by devices which are suitable for executing the respective process step. All functions that are executed by the features of the subject-matter can be a process step of a process.

In some embodiments, the innovations may be implemented in additive manufacturing devices having diverse general-purpose or special-purpose computing systems. For example, the computing environment can be any of a variety of computing devices (e.g., desktop computer, laptop computer, server computer, tablet computer, gaming system, mobile device, programmable automation controller, etc.) that can be incorporated into a computing system comprising one or more computing devices.

In some embodiments, the computing environment includes one or more processing units and memory. The processing unit(s) execute computer-executable instructions. A processing unit can be a central processing unit (CPU), a processor in an application-specific integrated circuit (ASIC), or any other type of processor. In a multi-processing system, multiple processing units execute computer-executable instructions to increase processing power. A tangible memory may be volatile memory (e.g., registers, cache, RAM), non-volatile memory (e.g., ROM, EEPROM, flash memory, etc.), or some combination of the two, accessible by the processing unit(s). The memory stores software implementing one or more innovations described herein, in the form of computer-executable instructions suitable for execution by the processing unit(s).

A computing system may have additional features. For example, in some embodiments, the computing environment includes storage, one or more input devices, one or more output devices, and one or more communication connections. An interconnection mechanism such as a bus, controller, or network, interconnects the components of the computing environment. Typically, operating system software provides an operating environment for other software executing in the computing environment, and coordinates activities of the components of the computing environment.

The tangible storage may be removable or non-removable, and includes magnetic or optical media such as magnetic disks, magnetic tapes or cassettes, CD-ROMs, DVDs, or any other medium that can be used to store information in a non-transitory way and can be accessed within the computing environment. The storage stores instructions for the software implementing one or more innovations described herein.

Where used herein, the term "non-transitory" is a limitation on the computer-readable storage medium itself—that is, it is tangible and not a signal—as opposed to a limitation on the persistence of data storage. A non-transitory computer-readable storage medium does not necessarily store information permanently. Random access memory (which may be volatile, non-volatile, dynamic, static, etc.), read-only memory, flash memory, memory caches, or any other tangible, computer-readable storage medium, whether synchronous or asynchronous, embodies it.

The input device(s) may be, for example: a touch input device, such as a keyboard, mouse, pen, or trackball; a voice input device; a scanning device; any of various sensors; another device that provides input to the computing environment; or combinations thereof. The output device may be a display, printer, speaker, CD-writer, or another device that provides output from the computing environment.

The scope of protection of the present invention is given by the claims and is not limited by the features explained in the description or shown in the figures.

REFERENCE LIST 100 dental object
101 support structure
103 lattice structure
105 freely suspended geometry
107 triangle
109 building panel
111 vertical strut
113 diagonal or oblique strut
115 angled tip
117 strut

The invention claimed is:

1. A method of producing a dental object (100), comprising using a 3D printer for the steps of
    producing (S101) a pillared support structure (101) that extends from the dental object (100) to a building panel (109); and
    producing (S102) a lattice structure (103) configured to reinforce the support structure (101), the lattice structure (103) comprising one or more vertical struts (111) connected by one or more diagonal or oblique struts (113), the one or more vertical struts (113) (i) contact the building panel (109) without contacting the dental object (100).

2. The method according to claim 1,
    wherein the lattice structure (103) is arranged laterally adjacent to the support structure (101).

3. The method according to claim 1,
    wherein the lattice structure (103) is arranged around the support structure (101).

4. The method according to claim 1,
    wherein the support structure (101) is arranged on the lattice structure (103).

5. The method according to claim 1,
    wherein the lattice structure (103) is produced by at least one of a triangular structure, a quadrangular structure, a pentagonal structure, and a hexagonal structure.

6. The method according to claim 1,
    wherein the support structure (101) is integrated into the lattice structure (103).

7. The method according to claim 1,
    wherein the support structure (101) is at least partially replaced by the lattice structure (103).

8. The method according to claim 1,
    wherein vertical struts (111) of the lattice structure (103) are connected by diagonal or oblique struts (113) or diagonal or oblique struts (113,117) are arranged on or between the support structure (101).

9. The method according to claim 1,
    wherein the dental object (100), the support structure (101) and the lattice structure (103) are produced by means of a 3D printing process.

10. A dental object (100), comprising:
    a pillared support structure (101) on the dental object (100); and
    a lattice structure (103) for reinforcing the support structure (101),
    wherein the pillared support structure (101) extends from the dental object (100) to a building panel (109); and
    the lattice structure (103) is configured to reinforce the support structure (101), the lattice structure (103) comprising one or more vertical struts (111) connected by one or more diagonal or oblique struts (113), the one or more vertical struts (113) (i) contact the building panel (109) without contacting the dental object (100).

11. The dental object (100) according to claim 10,
    wherein the lattice structure (103) is arranged laterally adjacent to the support structure (101).

12. The dental object (100) according to claim 10,
    wherein the lattice structure (103) is arranged around the support structure (101).

13. The dental object (100) according to claim 10,
    wherein the support structure (101) is arranged on the lattice structure (103).

14. The dental object (100) according to claim 10, wherein the lattice structure (103) comprises at least one of a triangular structure, a quadrangular structure, a pentagonal structure, and a hexagonal structure.

15. A computer program product comprising program code which is stored on a non-transitory machine-readable medium, the machine-readable medium comprising computer instructions executable by a processor, which computer instructions cause the processor to perform the method according to claim 1.

16. The computer program product according to claim 15, wherein the processor is part of a 3D printing device.

\* \* \* \* \*